(12) United States Patent
Ohnishi et al.

(10) Patent No.: US 8,712,736 B2
(45) Date of Patent: Apr. 29, 2014

(54) METHOD FOR DESIGNING SUNLIGHT-REFLECTION AND HEAT-RADIATION MULTILAYER FILM

(75) Inventors: Akira Ohnishi, Tokyo (JP); Sumitaka Tachikawa, Atsugi (JP)

(73) Assignee: Ube Industries, Ltd., Yamaguchi (JP)

( * ) Notice: Subject to any disclaimer, the term of this patent is extended or adjusted under 35 U.S.C. 154(b) by 185 days.

(21) Appl. No.: 13/264,673

(22) PCT Filed: Apr. 19, 2010

(86) PCT No.: PCT/JP2010/056934
§ 371 (c)(1),
(2), (4) Date: Oct. 14, 2011

(87) PCT Pub. No.: WO2010/119974
PCT Pub. Date: Oct. 21, 2010

(65) Prior Publication Data
US 2012/0034476 A1 Feb. 9, 2012

(30) Foreign Application Priority Data
Apr. 17, 2009 (JP) ................................. 2009-101272

(51) Int. Cl.
*G06F 17/50* (2006.01)
(52) U.S. Cl.
USPC .......................................... 703/1; 244/171.7
(58) Field of Classification Search
USPC ............................................................ 703/1
See application file for complete search history.

(56) References Cited

U.S. PATENT DOCUMENTS

| 5,864,633 | A | * | 1/1999 | Opsal et al. | .................... 382/141 |
| 5,885,658 | A | * | 3/1999 | Babel et al. | .................... 427/409 |
| 6,279,857 | B1 | | 8/2001 | Roth | |

FOREIGN PATENT DOCUMENTS

| JP | S63-006504 A | 1/1988 |
| JP | H04-238797 A | 8/1992 |
| JP | 2001-249953 A | 9/2001 |
| JP | 2001-310800 A | 11/2001 |
| JP | 2003-315534 A | 11/2003 |

OTHER PUBLICATIONS

Shimazaki et al, "Development of Spectral Selective Multilayer Film for a Variable Emittance Device and Its Radiation Properties Measurements", International Journal of Thermophysics, vol. 24, No. 3, May 2003.*

Ohnishi et al, "Total Hemispherical Emittance of Polyimide Films for Space Use in the Temperature Range from 173 to 700 K", International Journal of Thermophysics, vol. 23, No. 1, Jan. 2002.*

(Continued)

*Primary Examiner* — Mary C Jacob
(74) *Attorney, Agent, or Firm* — Law Office of Katsuhiro Arai

(57) ABSTRACT

A design method for a thermal control film advantageously used in cosmic space, especially for a multilayer film, includes: setting at least two candidate materials for forming the multilayer film and the number of layers of the multilayer film; and designing a combination of the candidate material and a layer thickness by using a genetic algorithm stored in a computer-readable medium using an evaluation function, and recording the obtained results on a computer-readable medium. The evaluation function includes: $\alpha s = 1 - Rs$, wherein Rs represents a reflectance of solar energy in a wavelength range used for design, within a solar radiation wavelength range; and $\in H$: $\in H = 1 - R_{IR}$, wherein $R_{IR}$ represents a reflectance of heat radiation energy in a wavelength range used for design, within a heat radiation wavelength range.

8 Claims, 6 Drawing Sheets

(56) References Cited

OTHER PUBLICATIONS

Tachikawa et al, "Smart Radiation Device Based on a Perovskite Manganese Oxide", Proceedings of the 9th International Symposium on Materials in a Space Environment, Jun. 16-20, 2003.*

Shimazaki et al, "Computational Design of Solar Reflection and Far-Infrared Transmission Films for a Variable Emittance Device", Applied Optics, vol. 42, No. 7, Mar. 2003.*

Catalog by UBE Industries, LTD., UBE Thermal Control Films (prepared: Apr. 1992), http://www.upilex.jp/catalog/pdf/up_film.pdf, accessed: Oct. 14, 2011.

Written Opinion of the International Searching Authority for International application No. PCT/JP2010/056934, dated May 18, 2010.

* cited by examiner

FIG. 3

| Layer | Material | Thickness, μm |
|---|---|---|
| 30 | TiO$_2$ | 0.028 |
| 29 | SiO$_2$ | 0.162 |
| 28 | TiO$_2$ | 0.031 |
| 27 | SiO$_2$ | 0.071 |
| 26 | TiO$_2$ | 0.042 |
| 25 | SiO$_2$ | 0.266 |
| 24 | TiO$_2$ | 0.051 |
| 23 | SiO$_2$ | 0.223 |
| 22 | TiO$_2$ | 0.053 |
| 21 | SiO$_2$ | 0.089 |
| 20 | TiO$_2$ | 0.049 |
| 19 | SiO$_2$ | 0.095 |
| 18 | TiO$_2$ | 0.072 |
| 17 | SiO$_2$ | 0.120 |
| 16 | TiO$_2$ | 0.068 |
| 15 | SiO$_2$ | 0.087 |
| 14 | TiO$_2$ | 0.050 |
| 13 | SiO$_2$ | 0.094 |
| 12 | TiO$_2$ | 0.098 |
| 11 | SiO$_2$ | 0.095 |
| 10 | TiO$_2$ | 0.115 |
| 9 | SiO$_2$ | 0.093 |
| 8 | TiO$_2$ | 0.109 |
| 7 | SiO$_2$ | 0.095 |
| 6 | TiO$_2$ | 0.125 |
| 5 | SiO$_2$ | 0.098 |
| 4 | TiO$_2$ | 0.095 |
| 3 | SiO$_2$ | 0.095 |
| 2 | TiO$_2$ | 0.096 |
| 1 | SiO$_2$ | 0.200 |
| substrate | UPILEX-S | 75.000 |
|  | Al | 0.100 |

FIG. 8

| | | |
|---|---|---|
| (Layer 64) | BaF2 | 0.044 um |
| (Layer 63) | MgF2 | 0.069 um |
| (Layer 62) | TiO2 | 0.014 um |
| (Layer 61) | BaF2 | 0.051 um |
| (Layer 60) | MgF2 | 0.059 um |
| (Layer 59) | TiO2 | 0.037 um |
| (Layer 58) | MgF2 | 0.079 um |
| (Layer 57) | BaF2 | 2.102 um |
| (Layer 56) | TiO2 | 0.030 um |
| (Layer 55) | MgF2 | 0.127 um |
| (Layer 54) | TiO2 | 0.043 um |
| (Layer 53) | MgF2 | 0.133 um |
| (Layer 52) | TiO2 | 0.040 um |
| (Layer 51) | MgF2 | 0.126 um |
| (Layer 50) | TiO2 | 0.050 um |
| (Layer 49) | MgF2 | 0.031 um |
| (Layer 48) | BaF2 | 2.323 um |
| (Layer 47) | TiO2 | 0.052 um |
| (Layer 46) | BaF2 | 0.112 um |
| (Layer 45) | TiO2 | 0.054 um |
| (Layer 44) | MgF2 | 0.036 um |
| (Layer 43) | BaF2 | 0.089 um |
| (Layer 42) | TiO2 | 0.053 um |
| (Layer 41) | MgF2 | 0.152 um |
| (Layer 40) | TiO2 | 0.056 um |
| (Layer 39) | MgF2 | 0.158 um |
| (Layer 38) | a-Si | 0.029 um |
| (Layer 37) | TiO2 | 0.026 um |
| (Layer 36) | MgF2 | 0.190 um |
| (Layer 35) | a-Si | 0.035 um |
| (Layer 34) | MgF2 | 0.217 um |
| (Layer 33) | a-Si | 0.037 um |
| (Layer 32) | MgF2 | 0.200 um |
| (Layer 31) | a-Si | 0.046 um |
| (Layer 30) | MgF2 | 0.486 um |
| (Layer 29) | a-Si | 0.078 um |
| (Layer 28) | MgF2 | 0.270 um |
| (Layer 27) | a-Si | 0.036 um |
| (Layer 26) | MgF2 | 0.270 um |
| (Layer 25) | a-Si | 0.077 um |
| (Layer 24) | MgF2 | 0.254 um |
| (Layer 23) | a-Si | 0.067 um |
| (Layer 22) | MgF2 | 0.687 um |
| (Layer 21) | a-Si | 0.065 um |
| (Layer 20) | MgF2 | 0.254 um |
| (Layer 19) | a-Si | 0.068 um |
| (Layer 18) | MgF2 | 0.274 um |
| (Layer 17) | a-Si | 0.076 um |
| (Layer 16) | MgF2 | 0.335 um |
| (Layer 15) | a-Si | 0.105 um |
| (Layer 14) | MgF2 | 0.301 um |
| (Layer 13) | a-Si | 0.090 um |
| (Layer 12) | MgF2 | 0.402 um |
| (Layer 11) | Ge | 0.062 um |
| (Layer 10) | MgF2 | 0.603 um |
| (Layer 9) | Ge | 0.081 um |
| (Layer 8) | MgF2 | 0.500 um |
| (Layer 7) | Ge | 0.128 um |
| (Layer 6) | MgF2 | 0.500 um |
| (Layer 5) | Ge | 0.125 um |
| (Layer 4) | MgF2 | 0.495 um |
| (Layer 3) | Ge | 0.127 um |
| (Layer 2) | MgF2 | 0.500 um |
| (Layer 1) | Ge | 0.107 um |

Substrate

<Design Result of Fifth Stage>

$\alpha_S{}_{(0.25\sim2.5\mu m)} = 0.0742$ (0 deg.), 0.0521 (80 deg.)

$\varepsilon_H = 0.777$ (293K)

$\alpha_S/\varepsilon_H = 0.0671$

<Design Result of Fourth Stage>

$\alpha_S{}_{(0.4\sim2.5\mu m)} = 0.0790$ (0 deg.), 0.0388 (80 deg.)

$\varepsilon_H = 0.752$ (293K)

$\alpha_S/\varepsilon_H = 0.0516$

<Design Result of Third Stage>

$\alpha_S{}_{(0.6\sim2.5\mu m)} = 0.0484$ (0 deg.), 0.0104 (80 deg.)

$\varepsilon_H = 0.765$ (293K)

$\alpha_S/\varepsilon_H = 0.0136$

<Design Result of Second Stage>

$\alpha_S{}_{(0.8\sim2.5\mu m)} = 0.0517$ (0 deg.), 0.0105 (80 deg.)

$\varepsilon_H = 0.773$ (293K)

$\alpha_S/\varepsilon_H = 0.0136$

<Design Result of First Stage>

$\alpha_S{}_{(1.6\sim2.5\mu m)} = 0.1840$ (0 deg.), 0.00450 (80 deg.)

$\varepsilon_H = 0.789$ (293K)

$\alpha_S/\varepsilon_H = 0.00570$

METHOD FOR DESIGNING SUNLIGHT-REFLECTION AND HEAT-RADIATION MULTILAYER FILM

This application is the U.S. National Phase under 35 U.S.C. §371 of International Application PCT/JP2010/056934, filed Apr. 19, 2010, which claims priority to Japanese Patent Application No. 2009-101272, filed Apr. 17, 2009. The International Application was published under PCT Article 21(2) in a language other than English.

TECHNICAL FIELD

The present invention relates to a thermal control material preferably used in cosmic space, and more particularly, to a multilayer film structure which efficiently reflects sunlight and efficiently radiates infrared rays.

BACKGROUND ART

There is nothing to block sunlight in cosmic space and thus an enormous amount of solar energy is applied to surfaces of equipment used in the cosmic space, such as artificial satellites and space stations (hereinafter referred to as artificial satellites and the like). On the other hand, since precise machines are installed inside the artificial satellite, it is necessary to maintain the inside in an allowable temperature range.

The present applicant has marketed a thermal control material for use in outer space (UTC series) provided by evaporating aluminum or the like onto polyimide film known as UPILEX® (polyimide; registered trademark). However, to suppress an increase in temperature of the artificial satellite caused by sunlight and to dissipate heat generated inside, it is still desirable to develop an excellent material having an extremely low absorptance of sunlight ($\alpha s$) and a high thermal emittance ($\in H$).

NON-PATENT DOCUMENT

Non-Patent Document 1: "UBE Thermal Control Films" catalog by Ube Industries, Ltd., prepared April 1992

SUMMARY OF INVENTION

Problem to be Solved by the Invention

While the thermal control material for use in cosmic space requires the extremely low absorptance of sunlight ($\alpha s$) and the high thermal emittance ($\in N$ or $\in H$) as described above, the sunlight has a wide range of wavelengths, and thus the requirement cannot be satisfied by the idea of stacking quarter-wavelength films that is effective in a single wavelength.

To address this, it is an object of the present invention to provide a design method for a thermal control film advantageously used in cosmic space, especially a multilayer film favorably reflecting sunlight and having a high thermal emittance (that is, a sunlight reflecting and heat radiating multilayer film). It is also an object of the present invention to provide a multilayer film favorably reflecting sunlight and having a high thermal emittance (that is, a sunlight reflecting and heat radiating multilayer film). In the following description, the sunlight reflecting and heat radiating multilayer film is referred to simply as a sunlight reflecting multilayer film in some cases.

Means for Solving Problem

The present invention relates to the following.

[1]. A design method for a sunlight reflecting multilayer film having a multilayer film on a substrate, comprising:
(a) a step of setting at least two candidate materials for forming the multilayer film and the number of layers of the multilayer film; and
(b) a step of designing a combination of the candidate material and a layer thickness by using a genetic algorithm including:
 (b-1) a step of setting at least
  the number of individuals (n),
  a selection method,
  a crossover method and a probability of crossover, and
  a probability of mutation;
 (b-2) an initialization step of producing a set number of individuals of a first generation each having a set number of layers; and
 (b-3) a loop step of repeating sub steps (i) to (iii) until the number of generations reaches a predetermined number of generations or until an individual satisfying a predetermined evaluation criterion is obtained:
  (i) an evaluation step of evaluating the thus produced n individuals with evaluation functions;
  (ii) a selection step of selecting individuals to be subjects to a next step from the n individuals based on the evaluation; and
  (iii) a next-generation producing step of producing n individuals of a next generation from the selected individuals in accordance with the set crossover method and probability of crossover and the set probability of mutation,
the evaluation function including:

$$\alpha s = 1 - Rs \qquad \text{(evaluation function 1)}$$

(where Rs represents a reflectance of solar energy in a wavelength range used for design, within a solar radiation wavelength range); and $$\in H \qquad \text{(evaluation function 2)}$$

($\in H = 1 - R_{IR}$ where $R_{IR}$ represents a reflectance of heat radiation energy in a wavelength range used for design, within a heat radiation wavelength range).

[2]. A design method comprising:
a step of dividing a solar wavelength range into a predetermined m (where m is an integer of one or larger) of first to mth wavelength regions;
a first step of applying the design method according to [1] to the first wavelength region to design a first stack portion formed of a multilayer film; and
if m is 2 or larger, further performing a second step to an mth step by repeating kth step from k=2 to k=m, wherein k is an integer from two to m,
the kth step being a step of designing a multilayer structure, in which a kth stack portion formed of a multilayer film is placed on a structure including the first stack portion to a (k−1)th stack portion stacked sequentially, by applying the design method according to [1] to a wavelength region including the first to kth wavelength regions to design the kth stack portion to be placed on the (k−1)th stack portion, on the condition that a layer structure of the first to (k−1)th stack portions is not changed.

[3]. The design method according to [1] or [2], wherein, in the (evaluation function 1), Rs is represented by:

$$Rs = \int \text{reflectance}(\lambda) \cdot \text{weight function}(\lambda) d\lambda$$

wherein
a wavelength λ represents a wavelength in a wavelength range used for design, within a solar radiation wavelength range,
a reflectance (λ) represents a reflectance of the multilayer film at the wavelength λ calculated from optical constants of the materials and thickness of the layers forming the multilayer film, and
a weight function (λ) represents a function obtained by cutting out a wavelength range used for design in which λ, lies from the entire wavelength distribution of solar energy and normalized.

[4]. The design method according to [2], wherein m is an integer of two or larger.

[5]. The design method according to [2], wherein m is 1.

[6]. The design method according to [4], wherein m is an integer from three to 10.

[7]. The design method according to any one of [1] to [6], wherein a substrate on which the multilayer film is formed includes polyimide.

[8]. The design method according to any one of [1] to [7], wherein design is performed so as to satisfy:

$$\alpha s_{all} \leq 0.15 \text{ and } \in H_{all} \geq 0.75$$

(where $\alpha s_{all}$ represents an absorptance of sunlight in a substantially entire solar radiation wavelength region, and $\in H_{all}$ represents a total hemispherical emittance in a substantially entire heat radiation wavelength region).

[9]. A sunlight reflecting multilayer film comprising a multilayer film formed of at least two types of material on a polyimide substrate,
wherein the material forming the multilayer film is selected from the group consisting of metal or semiconductor or mixed crystal or alloy thereof, oxide of metal or semiconductor, and metal fluoride, and satisfies:

$$\alpha s_{all} \leq 0.15 \text{ and } \in H_{all} \geq 0.75$$

(where $\alpha s_{all}$ represents an absorptance of sunlight in a substantially entire solar radiation wavelength region, and $\in H_{all}$ represents a total hemispherical emittance in a substantially entire heat radiation wavelength region).

[10]. A sunlight reflecting multilayer film comprising a multilayer film formed of at least two types of material on a polyimide substrate,
wherein the material forming the multilayer film is selected from the group consisting of metal or semiconductor or mixed crystal or alloy thereof, oxide of metal or semiconductor, and metal fluoride, and
the multilayer film has a structure designed with the design method according to any one of [1] to [8].

Effect of the Invention

According to the present invention, it is possible to design the thermal control material advantageously used in cosmic space, especially the flexible thermal control film. According to the present invention, designed is a wide-band multilayer thin film having a high reflectance in a sunlight wavelength range from 0.26 to 2.6 μm and a high emittance in a wavelength range from 2.6 to 100 μm in which heat is radiated with the single thermal control material. Particularly, because of the application of the genetic algorithm to the design of the wide-band multilayer thin film, the number of layers of the multilayer film is reduced to one-third of that formed in the conventional ¼λ design method, and optimal design is enabled such that a high reflectance is provided in the wavelength range from 0.26 to 2.6 μm and a high emittance is provided in the wavelength range from 2.6 to 100 μm. In addition, in the present invention, the design can be modified so that the absorptance of sunlight corresponds to the incident angle of sunlight. In addition, the surface of the outermost layer which faces outer space can have electrical conductivity.

BRIEF DESCRIPTION OF THE DRAWINGS

FIG. 3 is a diagram showing a multilayer film structure designed in Embodiment 1.

FIG. 8 is a diagram showing a multilayer film structure designed in Embodiment 2.

MODE FOR CARRYING OUT THE INVENTION

Figure 1:
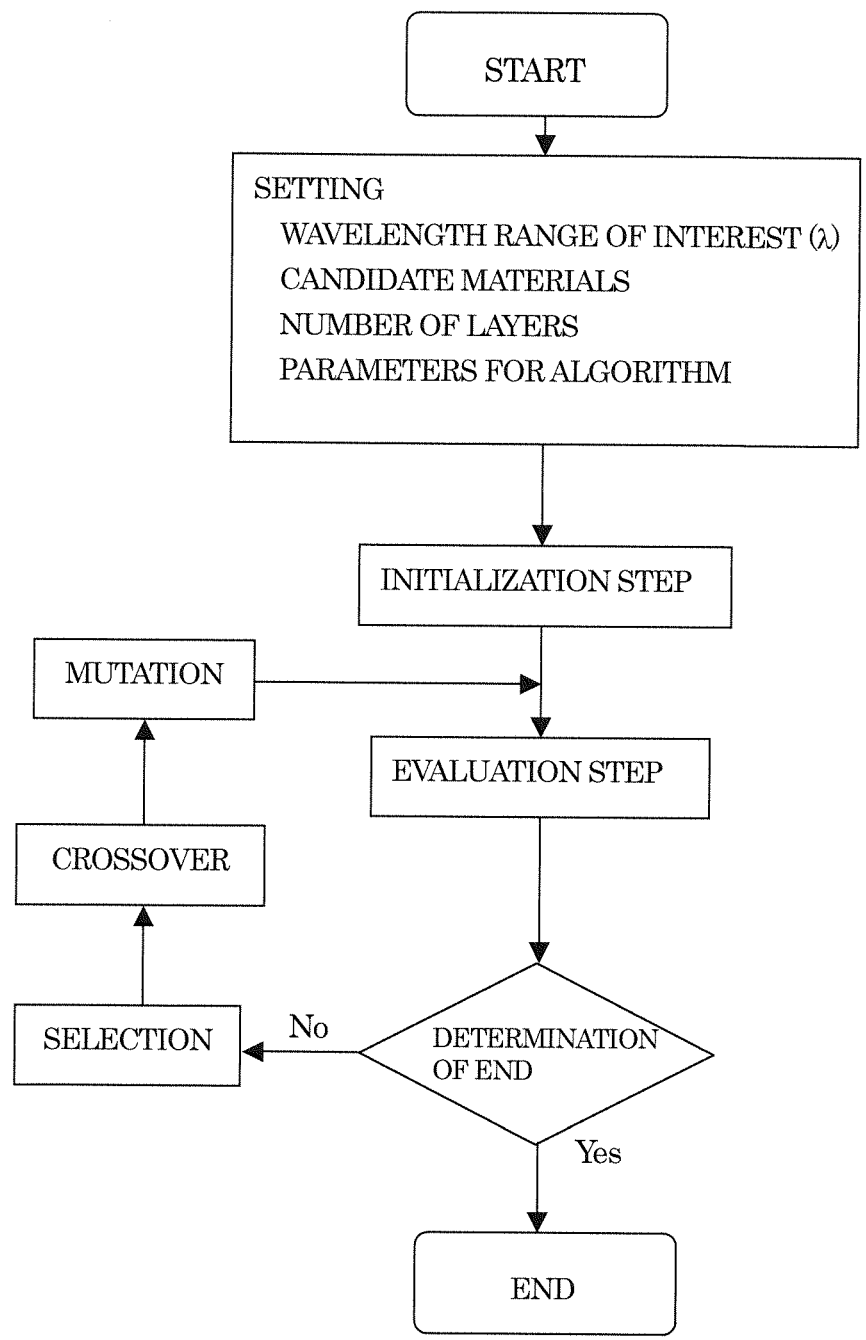
FIG. 1 is a flow chart showing a design method according to the present invention.

In the present invention, design of a multilayer film is performed so as to effectively reflect sunlight to reduce the absorptance of sunlight and to increase the thermal emittance in an infrared region. No limitations are imposed in principle on the materials of the multilayer film and a substrate on which the multilayer film is formed. The present invention, however, is intended for the design of a flexible thermal control film usable in cosmic space and a polyimide film is preferably used for the substrate, and particularly, UPILEX® (polyimide; registered trademark of Ube Industrials, Ltd.) is preferably used. For the multilayer film, materials resistant to cosmic environments are selected. Specifically, materials to be selected have resistance to ultraviolet rays, to electron beams and photon beams, to atomic oxygen, and to temperature cycles and thermal shocks. In addition, materials transparent in the wavelength region of sunlight and having a small extinction coefficient are selected. This is because the design philosophy in the present invention requires that the sunlight should be reflected on the basis of a difference in refractive index between materials to reduce transmitted light and that the absorption of light by the materials itself should be reduced.

Specifically, exemplary materials include metal or semiconductor such as Si (especially a-Si) and Ge or mixed crystal or alloy thereof; oxide of metal or semiconductor such as $SiO_2$, $TiO_2$, $HfO_2$, and $Ta_2O_5$; and metal fluoride such as $MgF_2$, $BaF_2$, and $CaF_2$. Typically, the materials are selected so as to include a combination of materials which have a large ratio in refractive index. For example, one or more are selected from $HfO_2$, $Ta_2O_5$, $TiO_2$, a-Si, Ge and the like as a material having a high refractive index, and one or more are selected from fluorides such as $CaF_2$, $MgF_2$, and $BaF_2$ as a material having a low refractive index.

It is also possible to give electrical conductivity by selecting a material for the surface of the outermost layer which faces outer space. In this case, design may be carried out, for example, such that only the material on the outermost layer is specified and fixed and the lower layers are formed of the abovementioned materials.

The present invention employs a genetic algorithm for designing the film thickness of each of layers formed of candidate materials constituting the multilayer film. Typically, in designing a dielectric multilayer reflecting film for a single or narrow wavelength band, it is known that materials having different refractive indices are stacked and formed with the optical thickness of a quarter wavelength to provide a highly reflective multilayer film. The sunlight, however, covers a wide wavelength region, and it is significantly difficult to perform design for achieving a high reflectance over the entire wavelength region. To address this, the present invention intends to provide a practical solution by using the genetic algorithm.

According to the present invention, it is found that the use of practical resources (analysis time and apparatus) provides a multilayer film which satisfies:

$$\alpha s_{all} \leq 0.15 \text{ and } \in H_{all} \geq 0.75$$

(where $\alpha s_{all}$ represents the absorptance of sunlight in the substantially entire solar radiation wavelength region, and $\in H_{all}$ represents the total hemispherical emittance in the substantially entire heat radiation wavelength region.)

In addition, the present invention relates to a sunlight reflecting multilayer film including a multilayer film formed of at least two types of material on a polyimide substrate, wherein the material forming the multilayer film is selected from the group consisting of metal or semiconductor, or mixed crystal or alloy thereof, oxide of metal or semiconductor, and metal fluoride.

The sunlight reflecting multilayer film preferably satisfies:

$$\alpha s_{all} \leq 0.15 \text{ and } \in H_{all} \geq 0.75$$

(where $\alpha s_{all}$ and $\in H_{all}$ are described above).

The absorptance in the wavelength spectrum of a 6000 K black body may be used as a substitute for $\alpha s_{all}$, and an emittance in the wavelength spectrum of a 300K black body may be used as substitute for than.

The sunlight reflecting multilayer film according to the present invention is preferably designed with the design method described above and below.

The design method according to the present invention will hereinafter be described with reference to a flow chart in FIG. 1.

<Setting of Parameters> a) First, a range of wavelengths in which design and analysis are performed is set. The wavelength range corresponds to a range in which evaluation is performed on the basis of (evaluation function 1), later described. The range is selected from a range having energy distribution in a solar radiation spectrum. The range may be substantially selected from a range of 0.26 to 2.6 μm, and more practically, may be a range from 0.25 to 2.5 μm. This is because the evaluation result is hardly influenced even if the wavelength out of this range is considered, since a weight function value is small, as described later.

The entire range of the solar radiation spectrum (for example, the range of 0.25 to 2.5 μm) may be used for the wavelength range, or a particular range selected from the entire range may be used. Embodiment 1, later described, focuses on a design with analysis in which the entire range is used. Embodiment 2, later described, focuses on a method in which analysis of a particular partial range selected from the entire range is accumulated to design the sunlight reflecting multilayer film ultimately.

The wavelength range selected here has no effect on $\in H$ in (evaluation function 2).

b) Next, candidate materials constituting the multilayer, the maximum and minimum numbers of layers of the multilayer structure to be designed, and the maximum and minimum film thicknesses of each layer are set.

Two or more materials are selected from the abovementioned materials so as to have a large difference in refractive index. Herein, the wavelength distribution of the optical constant of the material, that is, the refractive index (the real part of a complex refractive index) and the extinction coefficient (the complex part of the complex refractive index), is known.

The number of the layers of the multilayer structure is preferably set to 200 or less, more preferably 100 or less, since an extremely large number of layers do not necessarily achieve significantly favorable results. Since a small number of layers cannot provide a sufficient reflectance, five or more layers are typically set. In general, the thickness of the multilayer film as a whole is preferably set to 30 μm or less, more preferably 10 μm or less to maintain flexibility, and typically 0.1 μm or more.

c) Next, parameters necessary for the genetic algorithm are set. The necessary parameters include at least the number of individuals (n), a selection method, a crossover method and a probability of crossover, and a probability of mutation. These parameters to be set will be described in each step of the genetic algorithm shown below.

It should be noted that the order of the settings in a) to c) described above is not limited.

<Initialization Step>

In an initialization step, an initial group consisting of n individuals is produced. The length of a gene (the maximum and minimum numbers of the layers of the multilayer thin film) is already set. The type and the film thickness of the candidate material of each layer of the multilayer film serving as information for the gene are randomly provided for each individual. As a result, n individuals of a first generation, that is, n multilayer films are produced.

<Evaluation Step>

In an evaluation step, the adaptability of each individual of the generation of interest is evaluated with an evaluation function 1 for calculating αs and an evaluation function 2 for calculating ∈H.

The evaluation function 1 is represented by:

$$\alpha s \qquad \text{(evaluation function 1)}$$

(αs=1−Rs where Rs represents the reflectance of solar energy in the wavelength range used for design, within the solar radiation wavelength range.)

More specifically, Rs can be represented, for example by:

$$Rs = \int \text{reflectance}(\lambda) \cdot \text{weight function}(\lambda) d\lambda$$

(the integration range covers the entire range of λ)

The wavelength λ represents the wavelength in the wavelength range used for design, and as described earlier, is selected, for example from the range of 0.06 μm to 2.6 μm which covers substantially the distribution range of the sunlight, more practically the range of 0.25 to 2.5 μm. Embodiment 1, later described, focuses on the example in which the entire range is used. Embodiment 2, later described, focuses on the example in which the partial range is used.

The reflectance (λ) represents the reflectance of the multilayer film at the wavelength λ calculated from the optical constant of the material constituting the multilayer film and the layer thickness, and the weight function (λ) represents the function provided by normalizing the wavelength distribution of the solar energy in the wavelength range of interest such that the entire energy of the wavelength range of interest is equal to one.

That is, the reflectance (λ) of the multilayer film varies with wavelength. Rather than the reflectance (λ) is averaged uniformly, it is multiplied by the weight function determined according to the spectrum of the solar energy. This provides the overall energy reflectance which accords with the spectrum of the sunlight.

In addition, it is possible to design the multilayer film having an intended low absorptance of sunlight (αs) for a desired incident angle by performing calculation of the reflectance (λ) with respect to the desired incident angle. While αs shows the absorptance of the sunlight at an incident angle of zero (perpendicular incidence) in this application unless otherwise specified, it is possible to perform the design of multilayer film having an absorptance of sunlight of 0.1 or lower at an incident angle of 45°, for example. In other words, the present invention enables the design of the thermal control film optimal for the sunlight from any incident angle.

The evaluation function 2 is represented by:

$$\in H \qquad \text{(evaluation function 2)}$$

($\in H = 1 - R_{IR}$ where $R_{IR}$ represents the reflectance of heat radiation energy in the wavelength range used for design, of the heat radiation wavelength range.)

More specifically, $R_{IR}$ can be represented, for example by:

$$R_{IR} = \int \text{reflectance}_{IR}(\lambda)$$

(the integration range covers the entire range of λ)

As the wavelength range in $\in H$, the range in which heat radiation is intended is chosen. Typically, the range from 2.6 μm (2.5 μm may be used) to 100 μm is set.

The present invention employs the two evaluation functions, that is, αs (evaluation function 1) and $\in H$ (evaluation function 2). A smaller value is preferable for as and a larger value is preferable for $\in H$. The individuals are ranked in terms of superiority and inferiority for the adaptability by setting criteria, priority, or weighting to the values of the two evaluation functions.

By way of example, it is possible to employ a method in which a smaller αs is determined to be a higher adaptability on the condition that $\in H$ exceeds a predetermined value or higher (that is, a high or low value of $\in H$ is not considered when $\in H$ exceeds the predetermined value or higher). Embodiment 1 and Embodiment 2 employ a method in which a smaller as is determined to be a higher adaptability on the condition that $\in H \geq 0.75$ is satisfied (a high or low value of $\in H$ is not considered when $\in H \geq 0.75$ is satisfied).

<Selection Step>

In a selection step, an individual having a high adaptability is selected from the n individuals of the generation of interest. This corresponds to natural selection in nature. In the present invention, the method of selection is preferably realized by a scheme mainly using a tournament strategy, and more preferably, an elite preservation strategy is used in combination with the tournament strategy. A specific method of selection can be realized in various manners and is not particularly limited, but can be performed as follows, for example.

Assume that the number of individuals is n and the tournament size is set to N. First, N individuals are randomly selected from the n individuals, and an individual having the highest adaptability among the N individuals is preserved for the next processing. Next, N individuals are again selected randomly from the n individuals, and an individual having the highest adaptability among the N individuals is preserved. At this point, the individual selected next may be the same individual as preserved already. These steps are repeated and the selection is continued until the number of the preserved individuals reaches n. As a result, more excellent individuals are more likely to be selected, and individuals of a lower rank than the tournament size are naturally screened out. To maintain the variety of the group of individuals, however, a certain number of individuals having a low adaptability are possibly to be selected.

The selected n individuals are subjected to the next crossover step. At this point, the elite preservation strategy is additionally used to hold and pass the best individual in the evaluation stage to the next generation. Specifically, while the individual having the best adaptability at this point gives genes to another chromosome in the next crossover, the individual itself proceeds to a mutation stage, and then evolves to the next generation without mutation. This can prevent the found best individual from being extinguished.

<Crossover Step>

After the selection step, the selected individuals have relatively high adaptabilities at that point and they are likely to have an excellent gene. In the crossover step, in addition to regarding the individuals having high adaptabilities as important, they are used as bases for producing new individuals (search points). This processing is called crossover. In this case, two individuals are randomly selected from the selected n individuals to make a pair and it is determined whether or not the pair should be subjected to crossover on the basis of a set probability of crossover. The probability of crossover may be set to 1.0 (which means that the crossover is performed without exception). For the pair determined to be subjected to the crossover, their chromosomes are crossed over to produce two new chromosomes which replace the original chromosomes. The crossover can be performed in various methods and is not particularly limited. For example, one-point crossover, which is one of the most typical methods, can be used. In the one-point crossover, a crossover point is set at a position randomly selected on the gene of the individual, the gene is cut into two at that point, and the latter halves are exchanged to produce the genotypes of the next generation.

Specifically, at an arbitrary point of each of the randomly selected two individuals (=multilayer films), the multilayer film is cut into two, and the halves of the two individuals are exchanged, thereby producing two individuals (=multilayer films). When the elite preservation strategy is additionally used, the individual having the highest adaptability merely gives genes to the other of the pair and does not change itself.

<Mutation Step>

In the mutation step, all the genes of the chromosomes of all the individuals are changed on the basis of an extremely low probability of mutation, after the crossover of the chromosomes. If the mutation is not performed, it means that only the search is performed by rearranging the initial chromosomes. The purpose of the mutation is to avoid the limitation of the search range in the search space and to escape from a local solution. Even when the selection permits the opportunity of selection of an inferior individual, early convergence may occur in which the group of individuals converges to a local solution at an early stage of the evolution process. The mutation is an extremely effective means of escaping from such situation. This is performed in order to further increase the variety of the group of individuals. However, setting of a large probability of mutation may impair the advantages of the genetic algorithm. That is, it becomes simple random search, rather than the use of the evolution process of creatures (natural selection).

The mutation can be performed in various methods in the design method according to the present invention. For example, the type and/or the film thickness of the candidate material is randomly changed in a randomly selected layer with a set probability of mutation for the individual.

<Repeating Loop and Determination of End>

After the mutation step, the group of the individuals of the next generation returns to the evaluation step described above, and the loop including the four steps:
- the evaluation step,
- the selection step,
- the crossover step, and
- the mutation step is repeated. Each time the loop is repeated, the generation is updated.

When the number of generations reaches a preset number, or when αs and ∈H fall within an allowable range of design values, the processing is ended.

Embodiment 1

In this embodiment, the multilayer structure was designed by one calculation process by setting the wavelength range used for design to the range from 0.25 μm to 2.5 μm which substantially covers the solar radiation spectrum. In Embodiment 1, the parameters were set as follows.

Substrate: UPILEX® R (polyimide; registered trademark), polyimide manufactured by Ube Industrials, Ltd., with a thickness of 3.0 μm
- The number of candidate materials of the multilayer film: 2
- Candidate materials: $TiO_2$, $SiO_2$
- The number of layers: 30
- The number of individuals n: 20
- Tournament size N: 4
- The final number of generations: 50,000
- Probability of crossover: 1.0
- Probability of mutation: 0.1

Figure 2:
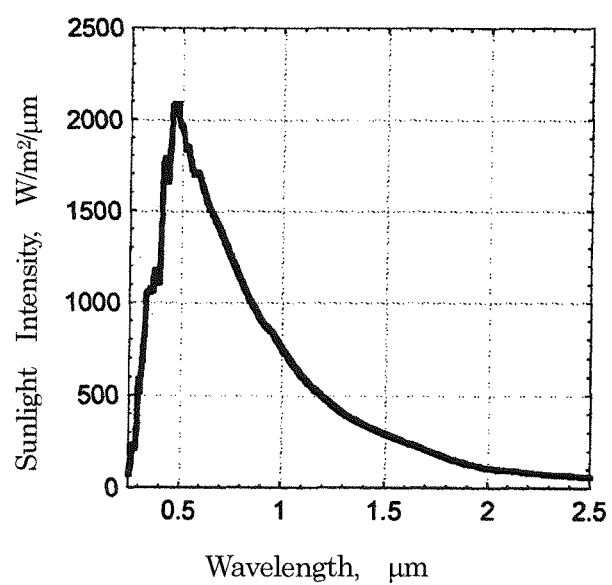
FIG. 2 is a graph showing a weight function (not normalized) used in Embodiment 1, that is, a solar radiation spectrum of interest.

In the evaluation function 1, the wavelength range of interest was set to the range from 0.25 μm to 2.5 μm, and the weight function in Rs was calculated by normalizing (so that the integral value is equal to one) the solar energy distribution from 0.25 μm to 2.5 μm shown in FIG. 2. In the evaluation function 2, the wavelength range of interest was set to the range from 2.6 μm to 100 μm.

On the basis of the foregoing, the abovementioned genetic algorithm was used to perform calculations with computers, and the following results were obtained.

αs=0.070
∈H=0.787 (at 373 K)

The layer configuration is shown in FIG. 3.

While the two types of candidate materials were used in this embodiment, three or more types may be used. Even when three or more types of candidate materials, for example four types, are used, it may happens that the results may be a combination of only three types or only two types of materials.

When the entire layer structure is designed by using the entire solar radiation wavelength region as in this embodiment, the number of layers is set to 5 to 60, preferably 10 to 50.

Embodiment 2

Next, Embodiment 2 of the present invention will be described. When the number of layers is increased in Embodiment 1 described above, for example when a multilayer structure including more than 50 layers is designed, the number of combinations is extremely increased and the expected design results may not be achieved. Better results were not easily obtained as compared with the design with, for example, 20 layers.

Embodiment 2 of the present invention provides a method in which the solar wavelength region, for example the wavelength range from 0.06 μm to 2.6 μm (which may substantially be the range from 0.25 μm to 2.5 μm) is divided into a predetermined m of wavelength sub-regions, and multilayer structures appropriate for the respective sub-regions are accumulated. It was found that this approach (when m is equal to or larger than two) could achieve better results. It should be noted that Embodiment 1 described above is considered to correspond to the case where m is equal to one in Embodiment 2.

In Embodiment 2, m is preferably two or more, more preferably three or more, and preferably 20 or less, more preferably 10 or less.

Embodiment 2 of the present invention will be described with reference to a specific example.

The wavelength region was divided into five sub-regions:
- first region: 1.6 μm to 2.5 μm
- second region: 0.8 μm to 1.6 μm
- third region: 0.6 μm to 0.8 μm
- fourth region: 0.4 μm to 0.6 μm
- fifth region: 0.25 μm to 0.4 μm The wavelength regions longer than 2.5 μm and shorter than 0.25 μm were ignored.

Figure 4:
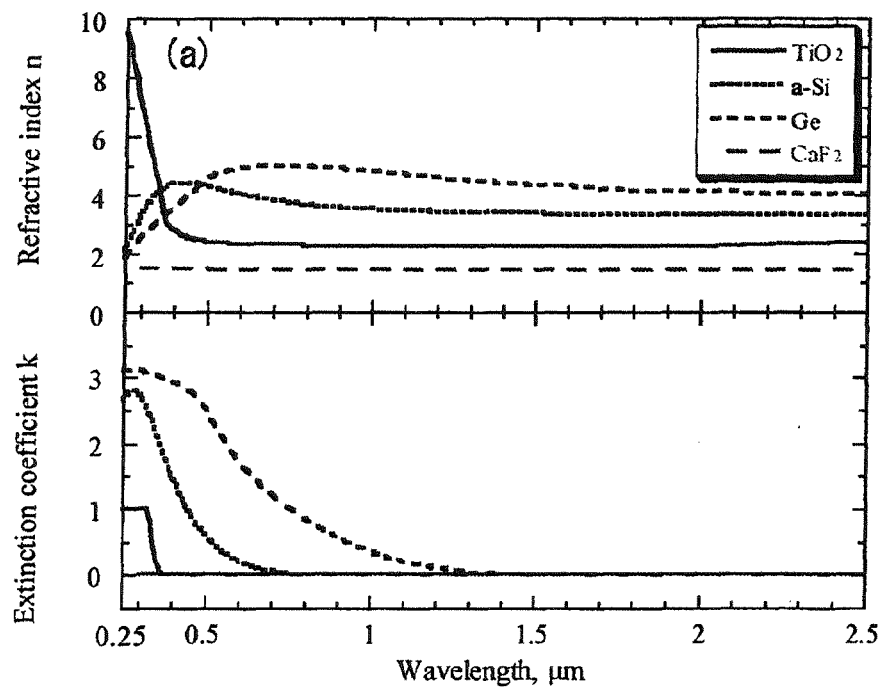
FIG. 4 is a graph showing the optical constants of materials used in Embodiment 2.

The candidate materials as materials suitable for reflection in each region were set as follows:
- first region: Ge, $MgF_2$
- second region: a-Si, $MgF_2$
- third region: $TiO_2$, a-Si, $MgF_2$
- fourth region: $TiO_2$, $MgF_2$, $BaF_2$
- fifth region: $TiO_2$, $MgF_2$, $BaF_2$ FIG. 4 shows the optical constants of the representative candidate materials.

The present embodiment employed a scheme in which first to fifth stack portions were accumulated five times of first to fifth stages. While the algorithm used in each stage was already described, different points from those in Embodiment 1 will be described below. In all the first to fifth stages, the wavelength range of interest in the evaluation function 2 was set to the range from 2.6 μm to 100 μm similarly to Embodiment 1.

(1) First Stage: Multilayer Structure Design of First Stack Portion

Figure 5:
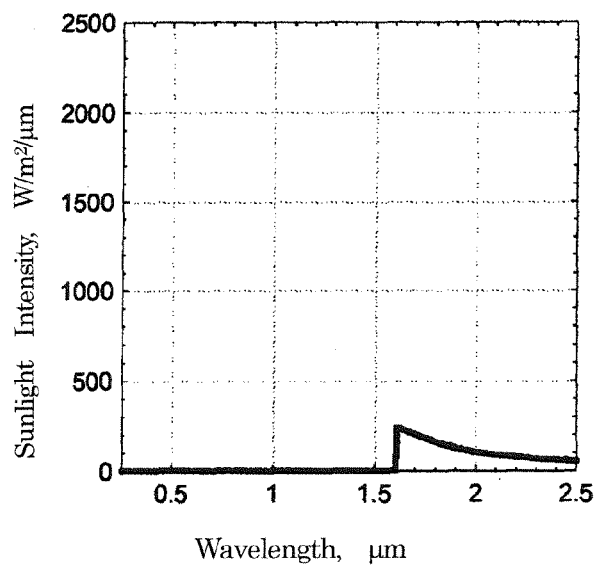
FIG. 5 is a graph showing a weight function (not normalized) used in a first step of Embodiment 2.

A weight function used in the first stage is shown in FIG. 5. However, FIG. 5 shows the function which is not normalized and obtained by cutting the wavelength range of the first region from the solar energy distribution.

The reflectance is determined as follows:

$$Rs = \int reflectance(\lambda) \cdot weight\ function(\lambda) d\lambda$$

and only the characteristics in the wavelength range of the first region are considered. As a result, the reflectance may be calculated from the optical constant in the wavelength range of the first region (1.6 μm≤λ≤2.5 μm).

The evaluation function 1 is represented by:

$$\alpha s \qquad \text{(evaluation function 1)}$$

(αs=1−Rs where Rs represents the reflectance of sunlight in the wavelength range of the first region).

In the first stage, parameters were set as follows:

Substrate: UPILEX® R (polyimide; registered trademark), polyimide manufactured by Ube Industrials, Ltd., with a thickness of 25 μm The number of candidate materials of the multilayer film: 2
Candidate materials: Ge, $MgF_2$
The number of layers: 12
The number of individuals n: 20
Tournament size N: 4
The final number of generations: 50,000
Probability of crossover: 1.0
Probability of mutation: 0.1

The layer structure of the first stack portion placed on the polyimide film was designed in this manner.

(2) Second Stage: Multilayer Structure Design of Second Stack Portion

Figure 6:
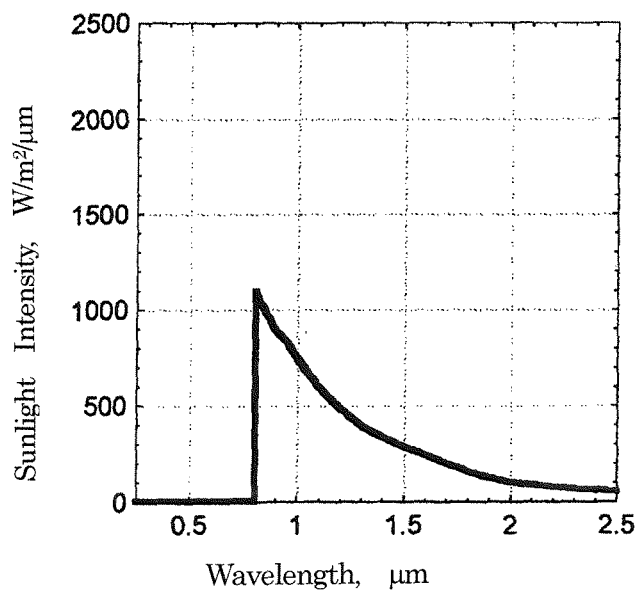
FIG. 6 is a graph showing a weight function (not normalized) used in a second step of Embodiment 2.

In the second stage, a second stack portion to be placed on the abovementioned first stack portion is designed. FIG. 6 shows a weight function used in the second stage. FIG. 6 shows the function which is not normalized and obtained by cutting the wavelength range of the first region and the second region from the sunlight energy distribution.

The reflectance is determined as follows:

$$Rs = \int reflectance(\lambda) \cdot weight\ function(\lambda) d\lambda$$

and the characteristics in the wavelength range of the second region and first region are considered. Thus, the reflectance is calculated from the optical constant in the wavelength range of the second region and first region (0.8 μm≤λ≤2.5 μm).

The evaluation function 1 is represented by:

$$\alpha s \quad \text{(evaluation function 1)}$$

($\alpha s = 1 - Rs$ where Rs represents the reflectance of sunlight in the wavelength range of the second region and first region).

When the genetic algorithm is applied in the second stage and the subsequent stages, the crossover and the mutation are performed on the stack portion of interest in each stage, that is, the second stack portion in the second stage, and the third stack portion in the third stage. In other words, no change is made to the preceding stack portion already designed and stacked in the previous stage.

In the second stage, parameters were set as follows:
The number of candidate materials of the multilayer film: 2
Candidate material: a-Si, $MgF_2$
The number of layers: 12
The number of individuals n: 20
Tournament size N: 4
The final number of generations: 50,000
Probability of crossover: 1.0
Probability of mutation: 0.1

The layer structure up to the second stack portion was designed in this manner.

(3) Third Stage: Multilayer Structure Design of Third Stack Portion

The third and subsequent stages are basically identical to the second stage.

Figure 7:
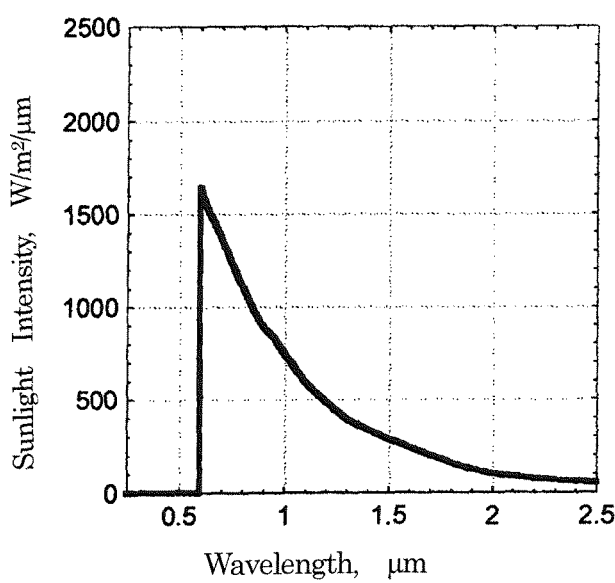
FIG. 7 is a graph showing a weight function (not normalized) used in a third step of Embodiment 2.

In the third stage, a third stack portion to be placed on the abovementioned second stack portion is designed. FIG. 7 shows a weight function used in the third stage. FIG. 7 shows the function which is not normalized and obtained by cutting the wavelength range of the first region, the second region, and the third region from the solar energy distribution, that is, the wavelength range which corresponds to the total of the region for which the design was completed in the previous stages and the region for which the design is performed currently.

The reflectance is determined as follows:

$$Rs = \int reflectance(\lambda) \cdot weight\ function(\lambda) d\lambda$$

and the characteristics in the wavelength range of the third region, second region, and first region are considered. Thus, the reflectance is calculated from the optical constant in the wavelength range of the third region, second region, and first region (0.6 μm≤λ≤2.5 μm).

The evaluation function 1 is represented by:

$$\alpha s \quad \text{(evaluation function 1)}$$

($\alpha s = 1 - Rs$ where Rs represents the reflectance of sunlight in the wavelength range of the third region, second region, and first region).

In the third stage, parameters were set as follows:
The number of candidate materials of the multilayer film: 3
Candidate material: $TiO_2$, a-Si, $MgF_2$
The number of layers: 16
The number of individuals n: 20
Tournament size N: 4
The final number of generations: 50,000
Probability of crossover: 1.0
Probability of mutation: 0.1

The layer structure up to the third stack portion was designed in this manner.

(4) Fourth Stage and Fifth Stage: Multilayer Structure Design of Fourth and Fifth Stack Portions In the subsequent stages, design is performed similarly to the third stage except that the range of the weight function is sequentially widened to the region of interest.

In each of the fourth and fifth stages, parameters were set as follows:
The number of candidate materials of the multilayer film: 3
Candidate material: $TiO_2$, $MgF_2$, $BaF_2$
The number of layers: 12
The number of individuals n: 20
Tournament size N: 4
The final number of generations: 50,000
Probability of crossover: 1.0
Probability of mutation: 0.1

The design of the multilayer structure of the present embodiment having the first to fifth stack portions is completed in this manner. Finally, the following result was obtained:

$\alpha s = 0.0521 (80°)$
$\in H = 0.777$ (at 293K)

FIG. 8 shows the entire layer configuration. In FIG. 8, the design result at each stage is also shown.

While the case where m is equal to five is described in the explanation of Embodiment 2, the present invention is not limited thereto. The selection of the candidate material in each stack portion is performed such that the selected material form part of a combination of materials capable of having a large ratio in refractive index and has a small extinction coefficient in the wavelength region of interest. The selection of the materials in the stack portions is performed such that the material having a small extinction coefficient in the entire solar wavelength range is selected as the candidate material of the stack portion on the upper layer.

In each stage of Embodiment 2, the design is performed with the number of layers set to a range from 5 to 100, preferably 50 or less, and more preferably 10 to 30.

Deposition Embodiment

Each layer was deposited to produce the multilayer structure so as to result in the multilayer structure (FIG. 3) designed in Embodiment 1, and then the spectral reflectance from ultraviolet to far infrared regions was measured. With the obtained spectral reflectance, the absorptance of sunlight was calculated by using the wavelength spectrum of a 6000 K black body, and the heat radiation was calculated by using the wavelength spectrum of a 300 K black body.

Calculation Results
$\alpha s=0.06$ (at 6000 K)
$\in_H=0.78$ (at 300 K)
$\in_N=0.78$ (normal emittance at 300 K)
Actual Measurement Results
$\alpha s=0.15$ (at 6000 K)
$\in_N=0.78$ (normal emittance at 300 K)

While the produced multilayer film showed the spectral reflectance lower than the calculated value in the near infrared region from 0.95 µm to 2.5 µm, it is considered that this also relates to the film quality of each layer associated with deposition conditions or the like. Thus, while $\alpha s$ of the actual measurement result is worse than that of the calculation result, $\alpha s$ is equal to 0.15 and it was shown that the practical multilayer film could be provided.

INDUSTRIAL APPLICABILITY

According to the present invention, it is possible to design the thermal control material advantageously used in cosmic space, particularly the thermal control film.

The invention claimed is:

1. A design method, comprising:
a step of dividing a solar wavelength range into a predetermined m of first to mth wavelength regions, wherein m is an integer of one or larger,
a first step of applying a multilayer film designing method to the first wavelength region to design a first stack portion formed of a multilayer film, said multilayer film designing method comprising;
(a) a step of setting at least two candidate materials for forming the multilayer film and a number of layers of the multilayer film;
(b) a step of designing a combination of the candidate materials and a layer thickness by using a genetic algorithm including:
(b-1) a step of setting at least
a number of individuals (n),
a selection method,
a crossover method and a probability of crossover, and
a probability of mutation;
(b-2) an initialization step of producing a set number of individuals of a first generation each having a set number of layers; and
(b-3) a loop step of repeating sub steps (i) to (iii) until a number of generations reaches a predetermined number of generations or until an individual satisfying a predetermined evaluation criterion is obtained:
(i) an evaluation step of evaluating the thus produced n individuals with evaluation functions;
(ii) a selection step of selecting individuals to be subjects to a next step from the n individuals based on the evaluation; and
(iii) a next-generation producing step of producing n individuals of a next generation from the selected individuals in accordance with the set crossover method and probability of crossover and the set probability of mutation,
the evaluation function including:
evaluation function 1: $\alpha s=1-Rs$ wherein Rs represents a reflectance of solar energy in a wavelength range used for design, within a solar radiation wavelength range;
evaluation function 2: $\in H$
wherein $\in H=1-R_{IR}$ where $R_{IR}$ represents a reflectance of heat radiation energy in a wavelength range used for design, within a heat radiation wavelength range; and
if m is 2 or larger, further performing a second step to an mth step by repeating kth step from k=2 to k=m, wherein k is an integer from two to m,
the kth step being a step of designing a multilayer structure, in which a kth stack portion formed of a multilayer film is placed on a structure including the first stack portion to a (k−1)th stack portion stacked sequentially, by applying the design method to a wavelength region including the first to kth wavelength regions to design the kth stack portion to be placed on the (k−1)th stack portion, on the condition that a layer structure of the first to (k−1)th stack portions is not changed.

2. The design method according to claim 1, wherein, in the evaluation function 1, Rs is represented by:

$Rs=\int reflectance(\lambda) \cdot weight\ function(\lambda) d\lambda$ wherein
a wavelength $\lambda$ represents a wavelength in a wavelength range used for design, within a solar radiation wavelength range,
a reflectance ($\lambda$) represents a reflectance of the multilayer film at the wavelength $\lambda$ calculated from optical constants of the materials and thickness of the layers forming the multilayer film, and
a weight function ($\lambda$) represents a function obtained by cutting out a wavelength range used for design in which $\lambda$ lies from the entire wavelength distribution of solar energy and normalized.

3. The design method according to claim 1, wherein m is an integer of two or larger.

4. The design method according to claim 3, wherein m is an integer from three to 10.

5. The design method according to claim 1, wherein m is 1.

6. The design method according to claim 1, wherein a substrate on which the multilayer film is formed includes polyimide.

7. The design method according to claim 1, wherein design is performed so as to satisfy:

$\alpha s_{all} \leq 0.15$ and $\in H_{all} \geq 0.75$ wherein $\alpha s_{all}$ represents an absorptance of sunlight in a substantially entire solar radiation wavelength region, and $\in H_{all}$ represents a total hemispherical emittance in a substantially entire heat radiation wavelength region.

8. The method according to claim 1, wherein the genetic algorithm is stored in a computer-readable medium, and a result of step (b) is recorded on a non-transitory computer-readable medium.

* * * * *